US010569731B2

(12) United States Patent
Thiele

(10) Patent No.: US 10,569,731 B2
(45) Date of Patent: Feb. 25, 2020

(54) LINEAR BLOCKING APPARATUS HAVING A LINEAR DEVICE WHICH IS LONGITUDINALLY DISPLACEABLE ALONG AN AXIS AND IS GUIDED IN A HOUSING, AND MODULAR SYSTEM FOR THE SECUREMENT AND RELEASE OF PERSONS, OBJECTS OR THE LIKE, HAVING A LINEAR BLOCKING APPARATUS OF THIS TYPE

(71) Applicant: Horst Thiele Maschinenbau-Hydraulische Geräte GmbH, Neuenstadt (DE)

(72) Inventor: Ewald Thiele, Neuenstadt (DE)

(73) Assignee: Horst Thiele Maschinebau-Hydraulische Geräte GmbH, Neuenstadt (DE)

( * ) Notice: Subject to any disclaimer, the term of this patent is extended or adjusted under 35 U.S.C. 154(b) by 81 days.

(21) Appl. No.: 15/967,481

(22) Filed: Apr. 30, 2018

(65) Prior Publication Data

US 2018/0334125 A1 Nov. 22, 2018

(30) Foreign Application Priority Data

May 16, 2017 (DE) .................. 10 2017 004 664

(51) Int. Cl.
*B60R 21/02* (2006.01)
*B60R 22/48* (2006.01)
(Continued)

(52) U.S. Cl.
CPC ............ *B60R 21/02* (2013.01); *A63G 7/00* (2013.01); *B60R 22/12* (2013.01); *B60R 22/48* (2013.01);
(Continued)

(58) Field of Classification Search
CPC ........ B60R 21/20; B60R 22/12; B60R 22/48; B60R 22/1955; B60R 2021/022; B60R 2021/028; B60R 2021/0097; A63G 7/00
See application file for complete search history.

(56) References Cited

U.S. PATENT DOCUMENTS 3,239,273 A * 3/1966 Pitney ................. B60R 22/1955
297/480
3,892,073 A * 7/1975 Plantif ................ B60R 22/1955
60/635

(Continued)

FOREIGN PATENT DOCUMENTS

DE 3412139 A1 10/1984
DE 102009028568 5/2018

(Continued)

*Primary Examiner* — Faye M Fleming
(74) *Attorney, Agent, or Firm* — Smartpat PLC

(57) ABSTRACT

A linear blocking apparatus has a linear device which is longitudinally displaceable along an axis and is guided in a housing. It is possible to switch back and forth, by means of a connectable or integrated switching device, between two motional states of the linear device. The linear device acts directly or indirectly on a rotary device. The rotary device, in dependence on the motional direction of the linear device, can be set in rotation in diverse rotational directions. A, in particular mechanical, blocking device is present, which is, or can be brought, directly or indirectly into operative connection with the rotary device. The blocking device is actuable by the switching device, whereby it is possible to switch back and forth between a first motional state and a second motional state of the linear device, and hence between the possible rotational directions of the rotary device.

17 Claims, 5 Drawing Sheets

(51) Int. Cl.
  *B60R 22/12* (2006.01)
  *A63G 7/00* (2006.01)
  *B60R 22/195* (2006.01)
  *F16H 25/24* (2006.01)
  *B60R 21/00* (2006.01)

(52) U.S. Cl.
  CPC ...... *F16H 25/2454* (2013.01); *B60R 22/1955* (2013.01); *B60R 2021/0097* (2013.01); *B60R 2021/022* (2013.01); *B60R 2021/028* (2013.01)

(56) References Cited

U.S. PATENT DOCUMENTS

| | | | | |
|---|---|---|---|---|
| 4,008,909 | A | * | 2/1977 | Otani .................. B60R 22/1955 297/470 |
| 4,589,301 | A | | 5/1986 | Griner |
| 5,704,638 | A | * | 1/1998 | Lane, Jr. ............... B60R 21/207 280/730.2 |
| 6,406,059 | B1 | * | 6/2002 | Taubenberger ......... B60R 21/18 280/733 |
| 6,890,000 | B2 | * | 5/2005 | Taubenberger ......... B60R 21/18 280/730.2 |
| 8,448,983 | B2 | * | 5/2013 | Fukawatase ........... B60R 21/18 280/733 |
| 2006/0103212 | A1 | | 5/2006 | Waligora et al. |
| 2012/0068521 | A1 | | 3/2012 | Roodenburg et al. |

FOREIGN PATENT DOCUMENTS

| | | |
|---|---|---|
| GB | 2459297 A | 10/2009 |
| WO | 2009005337 A1 | 1/2009 |

\* cited by examiner

LINEAR BLOCKING APPARATUS HAVING A LINEAR DEVICE WHICH IS LONGITUDINALLY DISPLACEABLE ALONG AN AXIS AND IS GUIDED IN A HOUSING, AND MODULAR SYSTEM FOR THE SECUREMENT AND RELEASE OF PERSONS, OBJECTS OR THE LIKE, HAVING A LINEAR BLOCKING APPARATUS OF THIS TYPE

TECHNICAL FIELD

The present invention relates to a linear blocking apparatus having a linear device which is longitudinally displaceable along an axis and is guided in a housing, wherein it is possible to switch back and forth, by means of a connectable or integrated switching device, at least between two motional states of the linear device, namely between a first motional state, in which the linear device is displaceable along the axis within a limited length of travel, either in the motional direction facing away from the housing or in the motional direction facing toward the housing, and is blocked in the respectively opposite direction, and a second motional state, in which the linear device is displaceable along the axis within a limited length of travel, in the two opposite motional directions.

The present invention further relates to a modular system for the securement and release of persons, objects or the like.

In general terms, the linearization problem describes the question of the way in which a two-way free linear motion of a guided component can be blocked in one motional direction.

BACKGROUND

Such linear blocking apparatuses and modular systems for the securement and release of persons, objects or the like are used in many safety-relevant technical fields. Based on the example of a person to be secured in a fairground ride (rollercoaster), the working method of such a modular system and of a linear blocking apparatus is set out below.

FIG. 7 shows schematically a person P, who is secured by means of a modular system 18. The modular system 18 has a seat S and a locking device 16, which is configured as a safety bar. Between the two components, the person P sits in a secured state. The safety bar is pivotable about a pivot center Z in the pivot directions M1, M2. In a roller coaster ride it is on the one hand necessary that, after the person P has boarded, the safety bar 16 can be pivoted only downward and the seated person P, during the ride, is secured by this on the seat S, and on the other hand, after the completion of the ride, the safety bar 16 is freely movable or pivotable, so that this is swung away upward automatically of its own accord, or by action of the person P, and the person P is able to leave the seat S again. In order to ensure this working method, the modular system 18 has a linear blocking apparatus 100, which is coupled to the safety bar 16. The linear blocking apparatus 100 can be actuated such that it on the one hand releases the safety bar in both directions of the linear motion L1, L2, and thus the safety bar 16 in both pivot directions M1, M2, and on the other hand the downwardly directed linear motion L2 is blocked, so that analogously the upwardly direction pivot motion M2 of the safety bar is blocked. Moreover, a spring 17, which likewise constitutes a part of the modular system 18, is coupled to the safety bar 16 and the seat S. The spring 17 has the function of supporting an upwardly directed motion of the safety bar 16, which motion releases the person. In a further illustrative embodiment (not represented), the locking device 16 is configured as a linearly movable component.

It is known to design a linear blocking apparatus 100 of this type as a hydraulic component (hydraulic blocking). The linear blocking apparatus herein possesses a linear device which is mounted in guided arrangement in a housing. On the outer end face, i.e. on the end face facing away from the housing, of the linear device is found a first coupling element, which can be directly or indirectly coupled to the safety bar. On the opposite end face of the linear device sits cylindrically within the housing a hydraulic piston, which constitutes a part of the hydraulic system. By the targeted displacement of hydraulic fluid into chambers which in the linear direction on both sides adjoin the lateral piston surfaces, it is thus possible to block or release the motion of the linear unit within individual motional directions. In FIG. 7, the linear blocking apparatus 100 is represented merely schematically, a detailed representation of the hydraulic system, i.e. its individual components, and also the interconnection of these, having been dispensed with.

In hydraulic systems, problems arise, however, in respect of seal-tightness, since within the system only very small system pressures are necessary, so that the built-in seals cannot properly exert their sealing effect. Moreover, in hydraulic systems, a steady diffusion of gas generally takes place, which gas passes through into the fluid chamber, for instance via a nitrogen tank which is present or from outside, so that the damping property of the hydraulic fluid is offset by the springy effect of the diffused-in gas bubbles. During operation, the person to be secured then forms the impression that the locking device or safety bar is not working properly. This phenomenon is also therefore referred to as "spongy behavior".

These problems, caused by the use of hydraulic components lead, on the one hand, to a high maintenance requirement and, on the other hand, to an increased safety risk during operation, since, in the event of a breakdown or decreasing impact of the hydraulic system, the fixing effect of the linear blocking apparatus or of the locking device can no longer be ensured.

SUMMARY

The object or problem on which the present invention is founded lies in defining a linear blocking apparatus of the type stated in the introduction, which enables simple assembly, enables permanently reliable operation, has a low maintenance requirement, enables economic manufacture, and is distinguished by a permanently reliable blocking and release function. In addition, the object of the present invention lies in defining a modular system which enables a permanently reliable operation, has a low maintenance requirement and is distinguished by a permanently reliable locking function.

The linear blocking apparatus according to the invention, of the type stated in the introduction, is given by the features of the independent claim 1. Advantageous embodiments and refinements are the subjects of the dependent claims 2 to 16.

The linear blocking apparatus according to the invention is accordingly distinguished by the fact that the linear device acts directly or indirectly on a rotary device which is present, wherein the rotary device, in dependence on the motional direction of the linear device, can be set in rotation in diverse rotational directions, in particular about the axis, an, in particular mechanical, blocking device is present, which is, or can be brought, directly or indirectly in(to) operative connection with the rotary device, and the blocking device is actuable by the switching device, whereby it is possible to switch back and forth between the first motional state and second motional state of the linear device, and hence between the possible rotational directions of the rotary device.

A particularly advantageous embodiment is distinguished by the fact that the blocking device has a pivot bearing unit having a rotatable first bearing element, and a second bearing element which is rotatable relative thereto, the first bearing element is directly or indirectly coupled to the rotary device, and the blocking device has a blocking unit, by means of which the rotary motion of the second bearing element is blockable in both rotational directions.

An advantageous embodiment which ensures a particularly high, permanently reliable blocking and release function is distinguished by the fact that the first bearing element is configured rotatably relative to the second bearing element respectively only in one rotational direction, and a relative rotation in the opposite rotational direction is blocked.

According to a preferred embodiment, the pivot bearing unit is configured as a freewheel mechanism, wherein the first bearing element and the second bearing element have coaxially arranged, radially offset annular bodies, namely an inner annular body and an outer annular body.

In a preferred embodiment, the blocking unit is configured as a braking unit, in particular a positive-locking or non-positive-locking braking unit. In a further, particularly preferred embodiment, the braking unit is configured as an electromagnetic braking unit.

A particularly preferred embodiment is distinguished by the fact that a contact unit, on which the blocking unit acts, is formed onto or connected to the pivot bearing unit or the second bearing element.

An embodiment having particularly high functionality is distinguished by the fact that the blocking device or the blocking unit is actuable/activatable by the switching unit, wherein the switching unit is configured as a mechanical, pneumatic, hydraulic and/or electronic component.

A further alternative embodiment is distinguished by the fact that the second motional state of the linear device obtains in the activated/actuated state of the blocking device or of the blocking unit, and the first motional state of the linear device obtains in the inactive/non-actuated state of the blocking device or of the blocking unit.

Analogously, a further alternative embodiment of the linear blocking apparatus is distinguished by the fact that the second motional state of the linear device obtains in the inactive/non-actuated state of the blocking device or of the blocking unit, and the first motional state of the linear device obtains in the activated/actuated state of the blocking device or of the blocking unit.

A structurally simple and cost-effective embodiment of the linear blocking apparatus, which works particularly reliably during operation, is distinguished by the fact that the rotary unit has a spindle, in particular a ball screw having a coarse thread.

In a preferred embodiment, the spindle possesses a diameter in the range between 10 mm and 30 mm and, in the case of a particularly preferred embodiment, in the range between 15 mm and 25 mm, and most preferably around 20 mm.

Furthermore, in a preferred embodiment, the spindle stroke lies in the range between 80 mm and 150 mm and, in a particularly preferred embodiment, in the range between 90 mm and 110 mm.

In another preferred embodiment, the stroke length of the spindle per full revolution lies in the range between 10 mm and 30 mm and, in a particularly preferred embodiment, around 20 mm.

In a particularly preferred embodiment in the safety-relevant field, which embodiment is distinguished by a particularly permanently reliable blocking and release function, the linear blocking apparatus is coupled to a pivotable or linearly movable locking device, in particular a safety bar, for the selective securement of persons, objects or the like.

The modular system according to the invention for the securement and release of persons, objects or the like, of the type stated in the introduction, is given by the features of claim 17. According to this, the modular system according to the invention is distinguished by the fact that a linear blocking apparatus in accordance with the features of claims 1 to 16 and a locking device are present, and the linear blocking apparatus functions as a securing and release member for the locking device.

Further embodiments and advantages of the invention emerge from the features further cited in the claims and from the below-stated illustrative embodiments. The features of the claims can be combined with one another in any chosen manner insofar as they are not clearly mutually exclusive.

BRIEF DESCRIPTION OF THE DRAWINGS

The invention, as well as advantageous embodiments and refinements of the same, are described and explained in greater detail below with reference to the examples represented in the drawing. The features to be derived from the description and the drawing can be applied, according to the invention, individually or in plurality in any chosen combination, wherein.

DETAILED DESCRIPTION

Figure 1:
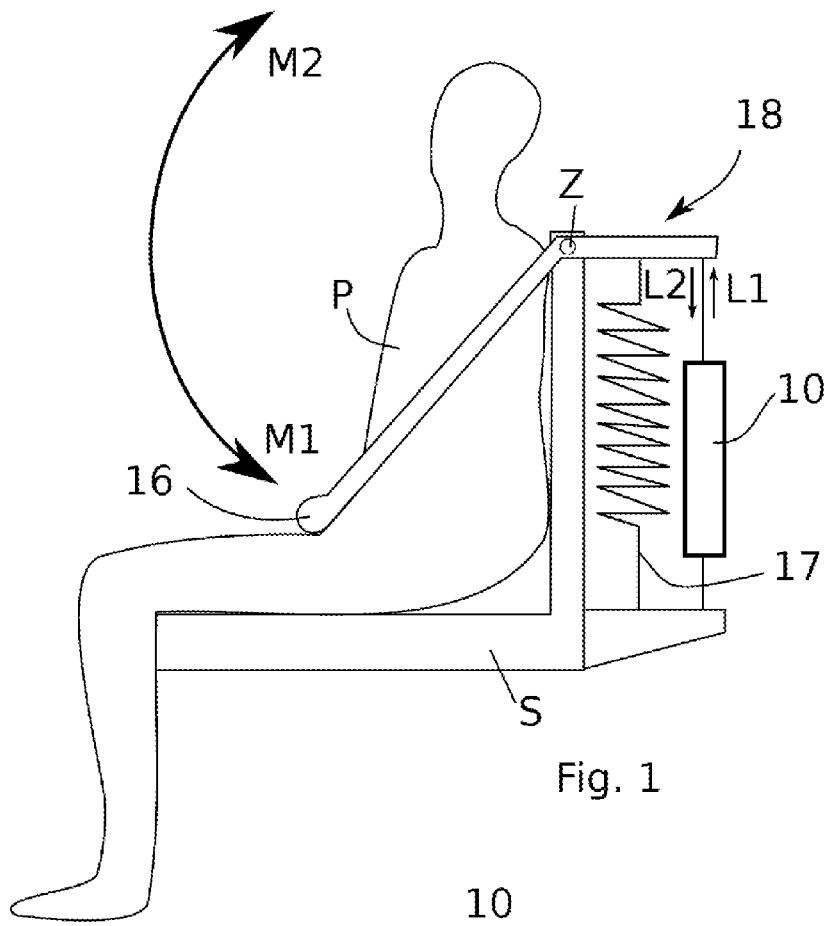
FIG. 1 shows a schematic side view of a person secured on a seat by means of a modular system, using a linear blocking apparatus according to the invention (represented schematically)

In FIG. 1, a modular system 18 is represented with a secured person P, wherein a linear blocking apparatus 10 according to the invention constitutes a part of the modular system 18. In addition, the modular system 18 consists of a locking device 16, pivotable about a pivot center Z in the pivot directions M1, M2, a spring 17, which to the right of the pivot center Z is coupled to the locking device 16 and to the left of the pivot center Z supports the upwardly directed pivot motion of the locking device 16 (clockwise). The linear blocking apparatus 10 is likewise coupled to the locking device 16 to the right of the pivot center Z. In one operating state of the modular system 18, the locking device 16 is to the right of the pivot center Z released in both directions of the linear motion L1, L2, and in another operating state the locking device 16 is blocked in the downwardly directed direction L2 (clockwise).

In contrast to the prior art, the linear blocking apparatus 10 is primarily an assembly of mechanical functional devices.

Figure 2:
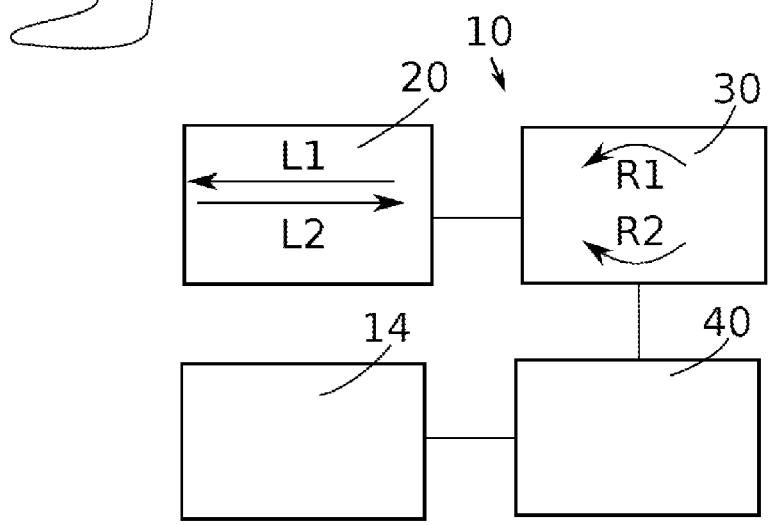
FIG. 2 shows a block diagram of the individual functional devices of a linear blocking apparatus.

In FIG. 2, a block diagram of the participating functional devices is represented schematically. Firstly, a linear device 20 is present, which is movable in two linear motional directions L1, L2 in relation to a fixed housing. The linear device 20 acts on a rotary device 30, which is rotatable in two rotational directions R1, R2 about an axis and is set in rotation by a linear motion of the linear device 20. An actuable blocking device 40 is, or can be brought, in(to) operative connection with the rotary device 30, wherein, in the activated state of the blocking device 40, the rotary device 30 is rotatable in the two rotational directions R1, R2 (second motional state of the linear device L1, L2), and in the non-activated state only in one rotational direction (R1 or R2) (first motional state of the linear device L1 or L2). The blocking device 40 is actuated by means of a switching device 14, which is controlled, for instance, by an operator and/or an electronics system.

Figure 3:
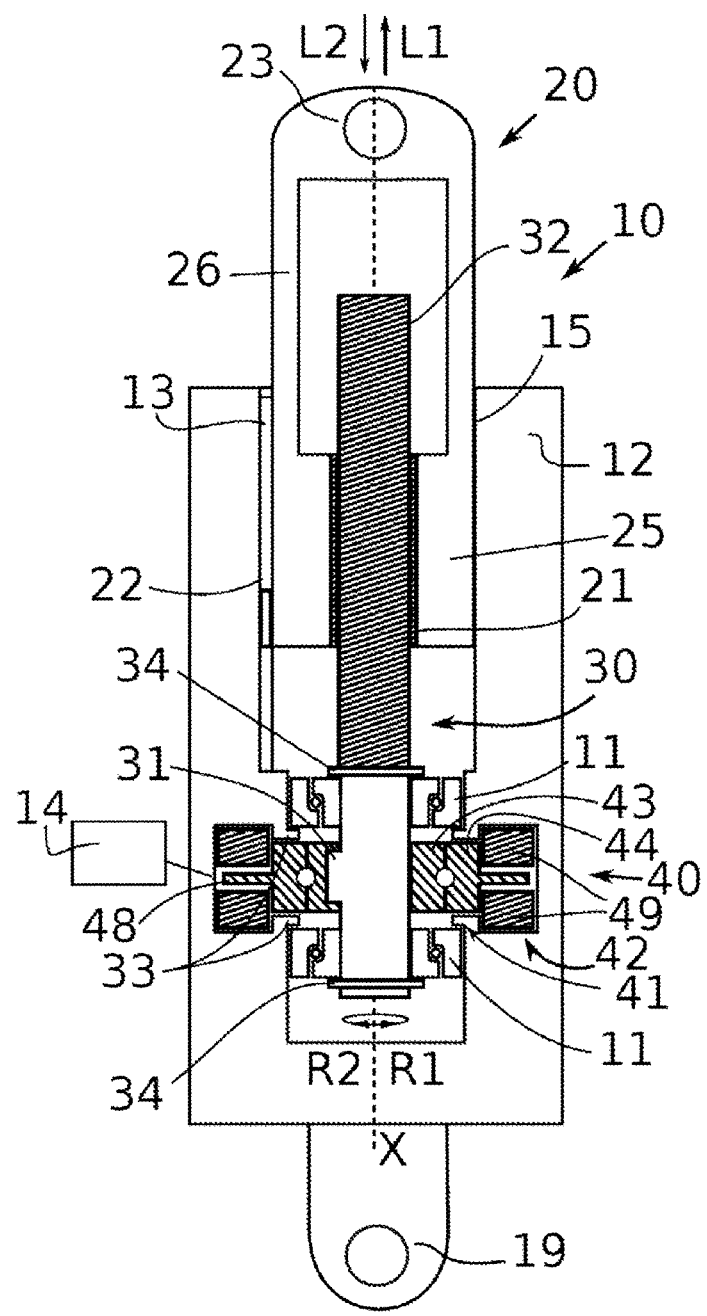
FIG. 3 shows a horizontal longitudinal sectional representation of a first illustrative embodiment of a linear blocking apparatus.

In FIG. 3, a linear blocking apparatus is represented according to a horizontal longitudinal section in accordance with the second motional state of the linear device, L1, L2, that is to say the linear device 20 is mounted slidingly with respect to a housing 12 and is movable along the two linear motional directions L1, L2. The linear device 20 has a tube unit 26, which is oriented coaxially to the axis X and of which the end region facing away from the housing is connected to by a second coupling element 23. A further first coupling element 19 is present, this is arranged along the axis X on the opposite part of the housing 12. On the inner side of the tube unit 26 is connected in the end region facing toward the housing 12, on the inner circumference, an annular spindle nut 25, which has superficially, on the side facing toward the axis X, a helical contour 21. The linear device 20 is guided slidingly on its outer side within the housing 12, wherein the guide 15 is configured as a self-guiding mechanism, so that the linear device 20 is linearly movable along the axis X. In the region of the guide 15, the housing 12 enclosing the linear device 20 assumes substantially a shape like that of a casing tube. On that casing side of the linear device 20 which is facing laterally toward the housing 12, a first feather key 22 is present, wherein the feather key 22 is guided in a groove 13 running in the longitudinal direction on the inner side of the housing 12, whereby the travel of the linear device 20 along the X-axis is also limited.

In addition, a rotary device 30 oriented coaxially to the axis X is present. This has a spindle 32, which engages in the spindle nut 25 of the linear device 20, wherein a displacement of the linear device 20 in one of the linear motional directions L1, L2 is translated into a rotational motion of the rotary device 30 about the axis X in respectively one of the two rotational directions R1, R2. In the annular gap which is formed between a spindle-free part of the rotary device 30 and the housing 12, two axial bearing units 11 are seated such that they bear radially against both components. These are respectively fixed along the axis X by a housing-side collar 33 and a rotary-device-side collar 34. The axial bearing units 11 thus fix the rotary device 30 in the linear motional direction with respect to the housing 12. By means of a second feather key 31, the rotational motion of the rotary device 30 is transmitted to a blocking device 40. The blocking device 40 possesses a pivot bearing unit 41, which in turn has a first bearing element 43 and a second bearing element 44. The bearing elements 43, 44 are in this illustrative embodiment configured as annular bodies, wherein the pivot bearing unit 41 is configured as a freewheel mechanism and the second feather key 31 engages in the first bearing element 43. Of particular note in a freewheel mechanism is that the annular bodies are configured such that they are rotatable relative to each other only in one rotational direction R1 about the axis X and the relative rotation in the opposite rotational direction R2 is blocked. Formed onto the outer annular body (bearing element 44) is a brake disk 48, which constitutes a part of the blocking unit 42. In addition, the blocking unit 42 has two circumferential brake linings 49, which are connected to the housing 12. In the represented illustrative embodiment, the brake disk 48 and the brake disk 49 form jointly an electromagnetic brake. A spring (not represented) acts in the inactivated state of the blocking device (no voltage at the electromagnetic brake) and blocks the second bearing element 44 in both rotational directions R1, R2 (first motional state of the linear device). In the activated state of the blocking device 40, the brake linings 49 are moved away from the brake disk 48 counter to the spring action and the second bearing element 44 is released (second motional state of the linear device).

Figures 4A, 4B:
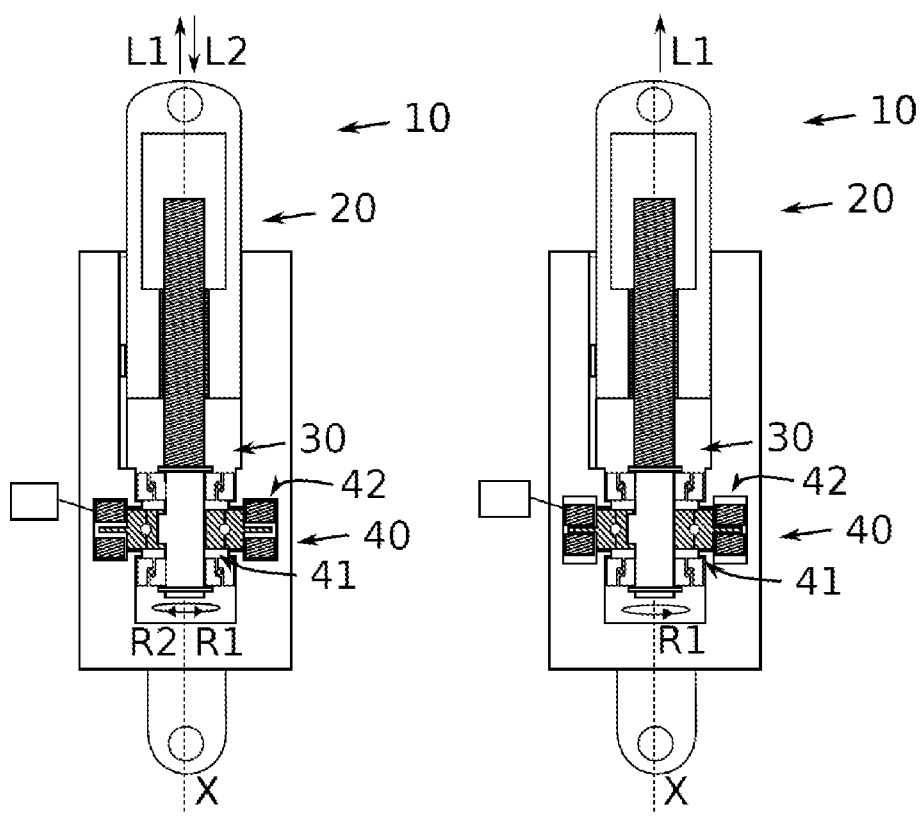
FIG. 4a shows a sectional representation according to FIG. 3 in a second motional state of a linear device, in which the linear device is movable in two linear directions.
FIG. 4b shows a sectional representation according to FIG. 3 in a first motional state of a linear device, in which the linear device is movable in one linear direction.

In FIG. 4a, the previously explained linear blocking apparatus 10 is represented. The blocking device 40 or the blocking device 42 is activated according to the second motional state of the linear device 20, so that a rotation of the rotary device 30 in both rotational directions R1, R2 is possible and the linear device 20 is displaceable in both linear motional directions L1, L2, since both bearing elements 43, 44 of the pivot bearing unit 41 are blocked in no rotational direction R1, R2.

Figures 5A, 5B:
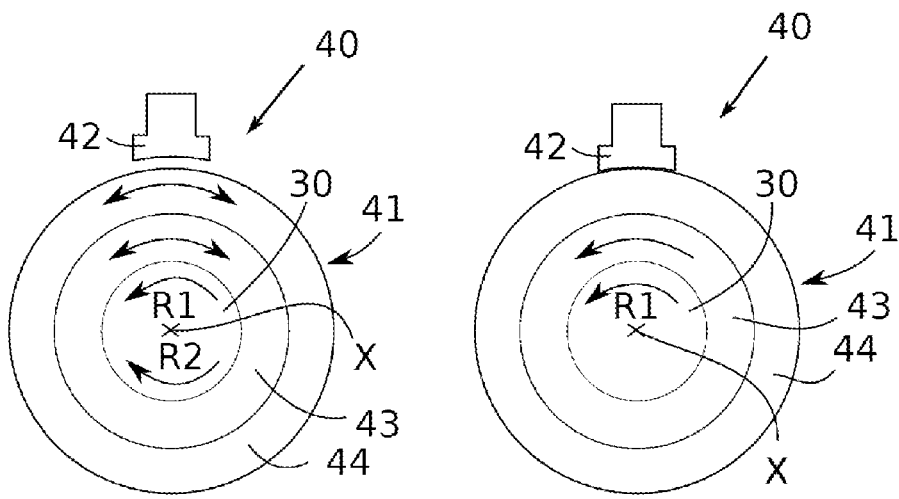
FIG. 5a shows a heavily schematized cross-sectional representation of the linear blocking apparatus in the region of the blocking device according to FIG. 4a, FIG. 5b shows a heavily schematized cross-sectional representation of the linear blocking apparatus in the region of the blocking device according to FIG. 4b.

In FIG. 5a, a simplified cross-sectional representation through the blocking device 40 and the rotary device 30 in the second motional state of the linear device 20 is shown, together with the indicated rotatabilities (arrows) of the individual components with respect to the axis X. The activated blocking unit 42 initially has no fixing/blocking effect on the second bearing element 44 of the pivot bearing unit 41, so that the second bearing element 44 is pivotable on both sides about the axis X. The first bearing element 43, which is movable relative to the second bearing element 44 only in one rotational direction, cannot have any blocking effect with respect to the second bearing element 44, since there is no point of force application of the second bearing element 44 on the housing, and is thus released also in both rotational directions R1, R2, so that also the rotary device 30 is ultimately rotatable in both rotational directions.

In FIGS. 4b and 5b, in analogous form, the linear blocking apparatus 10, or the blocking device 40 and the rotary device 30, is represented with the linear device 20 in the first motional state, in which the rotary device 30 is blocked in a rotational direction R2. Here, the blocking unit 42 is not activated (i.e. no voltage is present at the electromagnetic brake), so that the second bearing element 44 of the pivot bearing unit 41 is fixed to the housing by the blocking unit 42. Consequently, the rotary motion of the first bearing element 43 is blocked in a rotational direction R1, since the second bearing element 44 is held fast. The rotary device 30 fixedly connected to the first bearing element 43 is consequently also rotatable only in one rotational direction R1.

Figure 6:
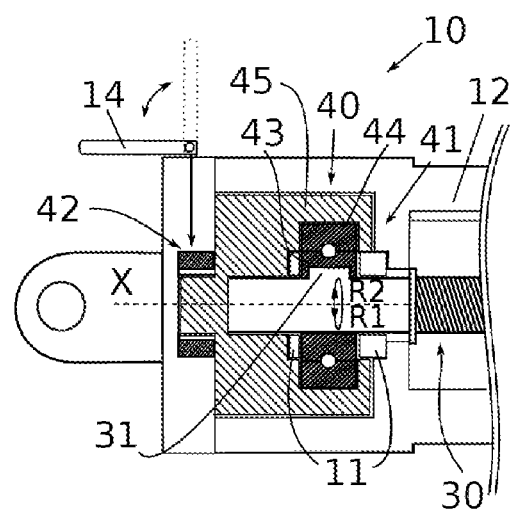
FIG. 6 shows a horizontal sectional representation of a further illustrative embodiment of the linear blocking device with focus on the blocking unit.
Figure 7:
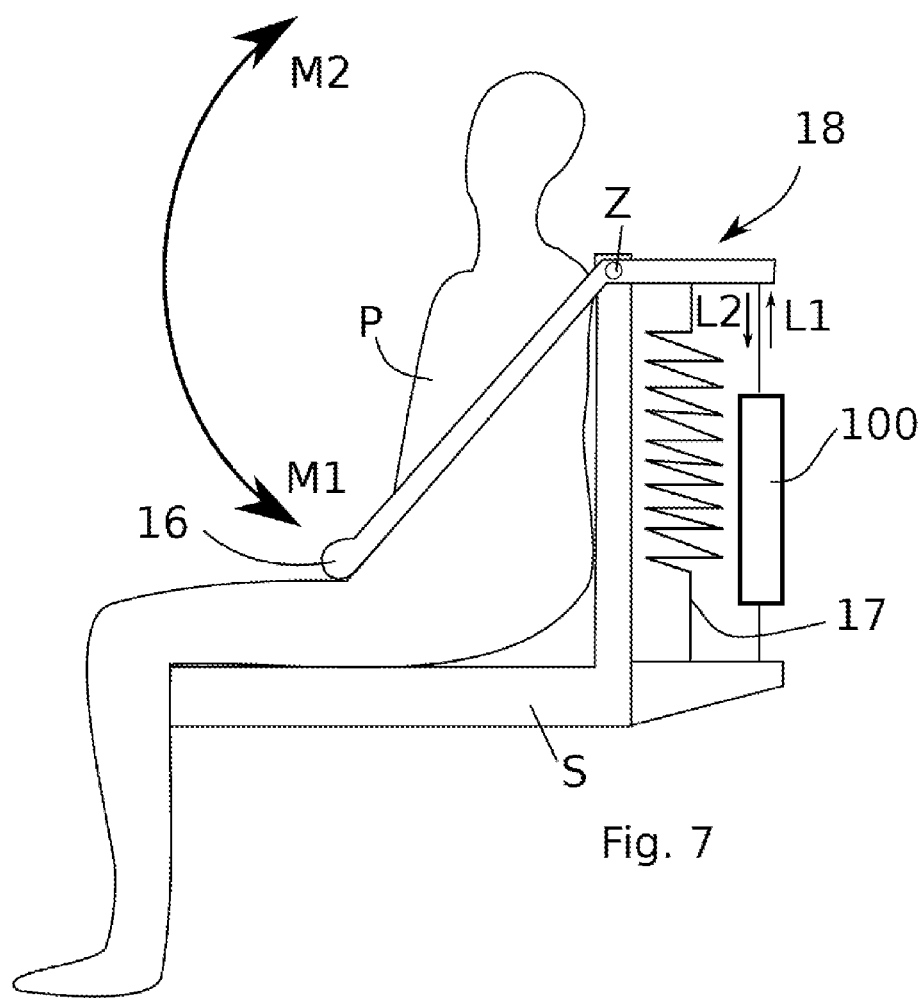
FIG. 7 shows a schematic side view of a person secured on a seat by means of a modular system, using a hydraulic linear blocking apparatus (prior art).

In FIG. 6, a second construction variant of the linear blocking apparatus 10 is represented, wherein only the region in the vicinity of the blocking device 40 is viewed and the motional state in which the rotary device 30 is released in both rotational directions R1, R2 obtains. In relation to the preceding construction variant, the difference consists in the fact that the blocking unit 42 does not act directly on the second bearing element 44 of the pivot bearing unit 41, but instead a contact unit 45 is fixedly connected to the second bearing element 44 and jointly executes, as it were, all rotational motions. In the region of the axis X sits on the left side the activated blocking unit 42, by means of which the contact unit 45, and hence also the second bearing element 44, is indirectly fixable to the housing 12, whereby the rotary device 30 is blockable in one motional direction. The second feather key 31, the first bearing element 43 and the axial bearing units 11 have a similar, or the same form as in the preceding illustrative embodiment. A further difference relative to the preceding illustrative embodiment consists in the fact that the switching device 14 is not configured as an electronic component, but instead as a mechanical, pivotable switch, by means of which the blocking unit 42 can be activated. Similarly, in a further embodiment (not represented), said switch can be designed as a button switch.

The basic working method of the linear blocking apparatus 10 can be described, according to FIG. 1, as follows. As the result of an external force which acts on the second coupling element 23, a linear device 20 can either only retract or only extend (depending on the orientation of the spindle 32). The respectively opposite motional direction can be released only by an electrical or manual pulse, which emanates from a switching device 42. This is realized by virtue of the fact that the linear motion is converted via the spindle 32, which is configured, for instance, as a coarse-threaded ball screw, into a rotatory motion. An exemplary diameter of such a spindle is, for instance, around 20 mm. The stroke length per full revolution of the spindle is, for instance, around 20 mm, and the total stroke of the linear device 20 lies, for instance, in the range between 80 mm and 150 mm. Also larger or smaller dimensions can be translated without difficulty. A freewheel mechanism blocks the rotational motion in one direction. Thus, depending on the direction in which the freewheel mechanism is installed, the linear device 20 can only be retracted or extended. The outer annular body of the freewheel mechanism 32 is here held over an electromagnetic braking unit via mechanical springs. Through the application of an electric voltage, these can be released and the linear device 10 can be moved counter to its original blocked direction until the voltage is removed again.

The blocking of the freewheel mechanism 32, or the securement of the outer annular body, can here be brought about by a blocking unit 42 (blocking system), which works either according to the principle of friction closure or of form closure. Generally, nor is it absolutely necessary for the blocking unit 42 to act directly on the freewheel mechanism. The freewheel mechanism can namely also be coupled to further components/a further component, which is/are set in motion by a rotary motion of the outer annular body, likewise in any form, preferably co-rotate(s), and the blocking unit 42 exerts its blocking effect on this/these component(s), so that the outer annular body is only indirectly blockable.

What is claimed is:

1. A linear blocking apparatus (10), having
    a linear device (20) which is longitudinally displaceable along an axis (X) and is guided in a housing (12), wherein it is possible to switch back and forth, by means of a connectable or integrated switching device (14), at least between two motional states of the linear device (20), namely between
        a first motional state (L1 or L2), in which the linear device (20) is displaceable along the axis (X) within a limited length of travel, either in the motional direction (L1) facing away from the housing (12) or in the motional direction (L2) facing toward the housing (12), and is blocked in the respectively opposite direction, and
        a second motional state (L1 and L2), in which the linear device (20) is displaceable along the axis (X) within a limited length of travel, in the two opposite motional directions (L1, L2),
    wherein the linear device (20) acts directly or indirectly on a rotary device (30) which is present, wherein the rotary device (30), in dependence on the motional direction (L1, L2) of the linear device (20), can be set in rotation in diverse rotational directions (R1, R2), and
    wherein a blocking device (40) is present, which is, or can be brought, directly or indirectly in operative connection with the rotary device (30), and
    wherein the blocking device (40) is actuable by the switching device (14), whereby it is possible to switch back and forth between the first motional state (L1 or L2) and second motional state (L1 and L2) of the linear device (20), and hence between the possible rotational directions (R1, R2) of the rotary device (30).

2. The linear blocking apparatus as in claim 1, wherein the rotary device (30) rotates about the axis (X) and wherein the blocking device (40) is a mechanical blocking device.

3. The linear blocking apparatus as in claim 1, wherein
    the blocking device (40) has a pivot bearing unit (41) having a rotatable first bearing element (43), and a second bearing element (44) which is rotatable relative thereto,
    the first bearing element (43) is directly or indirectly coupled to the rotary device (30), and
    the blocking device (40) has a blocking unit (42), by means of which the rotary motion of the second bearing element (44) is blockable in both rotational directions (R1, R2).

4. The linear blocking apparatus as in claim 3,
    wherein the first bearing element (43) is configured rotatably relative to the second bearing element (44) respectively only in one rotational direction (R2), and a relative rotation in the opposite rotational direction (R1) is blocked.

5. The linear blocking apparatus in claim 3,
    wherein the pivot bearing unit (41) is configured as a freewheel mechanism, wherein the first bearing element (43) and the second bearing element (44) have coaxially arranged, radially offset annular bodies, namely an inner annular body and an outer annular body.

6. The linear blocking apparatus as in claim 3,
    wherein the blocking unit (42) is configured as a braking unit.

7. The linear blocking apparatus as in claim 6, wherein the braking unit is positive-locking.

8. The linear blocking apparatus as in claim 6, wherein the braking unit is a non-positive-locking.

9. The linear blocking apparatus as in claim 6, wherein the braking unit is configured as an electromagnetic braking unit.

10. The linear blocking apparatus as in claim 1, wherein a contact unit (45), on which the blocking unit (42) acts, is formed onto or connected to the pivot bearing unit (41) or the second bearing element (44).

11. The linear blocking apparatus as in claim 1, wherein the blocking device (40) or the blocking unit (42) is actuable/activatable by the switching unit (14), and wherein the switching unit is configured as a mechanical, pneumatic, hydraulic and/or electronic component.

12. The linear blocking apparatus in claim 1, wherein the second motional state (L1 and L2) of the linear device (20) is present in the activated/actuated state of the blocking device (40) or of the blocking unit (42), and the first motional state (L1 or L2) of the linear device (20) is present in the inactive/non-actuated state of the blocking device (40) or of the blocking unit (42).

13. The linear blocking apparatus as in claim 1, wherein the rotary unit (30) has a spindle.

14. The linear blocking apparatus as in claim 1, wherein the spindle has a ball screw having a coarse thread.

15. The linear blocking apparatus as in claim 1, connected to a pivotable or linearly movable locking device (16).

16. The linear blocking apparatus as in claim 15 wherein the pivotable or linearly movable locking device (16) is a safety bar, for the selective securement of persons or objects.

17. A modular system (18) for the securement and release of persons or objects, wherein a linear blocking apparatus (10) as in claim 1 and a locking device (16) are present, and the linear blocking apparatus (10) functions as a securing and release member for the locking device (16).

* * * * *